(12) United States Patent
Wilkes

(10) Patent No.: US 10,627,231 B2
(45) Date of Patent: Apr. 21, 2020

(54) ADHERENT LEVEL

(71) Applicant: Charles Edward Wilkes, Gray Court, SC (US)

(72) Inventor: Charles Edward Wilkes, Gray Court, SC (US)

( * ) Notice: Subject to any disclaimer, the term of this patent is extended or adjusted under 35 U.S.C. 154(b) by 188 days.

(21) Appl. No.: 15/951,367

(22) Filed: Apr. 12, 2018

(65) Prior Publication Data

US 2019/0316904 A1 Oct. 17, 2019

(51) Int. Cl.
*G01C 9/28* (2006.01)
*G01C 9/34* (2006.01)

(52) U.S. Cl.
CPC ........ *G01C 9/28* (2013.01); *G01C 9/34* (2013.01)

(58) Field of Classification Search
CPC .......................................................... G01C 9/28
USPC .......................................... 33/370, 379, 381
See application file for complete search history.

(56) References Cited

U.S. PATENT DOCUMENTS

| | | | |
|---|---|---|---|
| 2,553,668 A | 5/1951 | Michael et al. | |
| 3,820,249 A | 6/1974 | Stone et al. | |
| 5,802,729 A | 9/1998 | OBrien et al. | |
| 6,029,360 A * | 2/2000 | Koch | G01C 9/28 33/381 |
| 6,131,298 A | 10/2000 | McKinney et al. | |
| 6,568,095 B2 | 5/2003 | Snyder | |
| 2002/0020072 A1* | 2/2002 | Roth | G01C 9/34 33/389 |
| 2002/0162236 A1* | 11/2002 | Roth | G01C 9/28 33/379 |
| 2006/0265891 A1* | 11/2006 | Murphy | G01C 9/28 33/379 |
| 2008/0229594 A1* | 9/2008 | Steiner | G01C 9/28 33/371 |
| 2009/0188121 A1* | 7/2009 | Rabin | G01C 9/26 33/332 |
| 2010/0115781 A1* | 5/2010 | Norelli | G01C 9/28 33/371 |
| 2011/0138642 A1* | 6/2011 | Norelli | G01C 9/28 33/371 |
| 2012/0246950 A1* | 10/2012 | Murray | G01C 9/02 33/379 |
| 2013/0167387 A1* | 7/2013 | Lueck | G01C 9/28 33/374 |
| 2016/0349048 A1* | 12/2016 | Rodriguez | G01C 9/28 |
| 2019/0041206 A1* | 2/2019 | Schubert | G01C 9/06 |

\* cited by examiner

*Primary Examiner* — George B Bennett
(74) *Attorney, Agent, or Firm* — Dunlap Bennett & Ludwig PLLC

(57) ABSTRACT

An adherent level. The level includes a level body. At least one level detector is coupled to the level body. A foam tape includes an inner surface and an outer surface. The inner surface is adhered to the level body. The outer surface includes a plurality of micro suction cups. The at least one level detector is operable to display a level reading of a surface when the level body is adhered to the surface by the plurality of micro suction cups.

4 Claims, 2 Drawing Sheets

ADHERENT LEVEL

BACKGROUND OF THE INVENTION

The present invention relates to levels and, more particularly, to a level that adheres to hard flat surfaces.

A spirit level, bubble level or simply a level is an instrument designed to indicate whether a surface is horizontal (level) or vertical (plumb). Different types of spirit levels may be used by carpenters, stonemasons, bricklayers, other building trades workers, surveyors, millwrights and other metalworkers. Magnets have been used to attach levels to ferromagnetic surfaces, such as carbon steel. However, magnets fail to attach levels to wood, stainless steel, aluminum and other non-ferromagnetic surfaces.

As can be seen, there is a need for an improved level that adheres to any hard flat surface.

SUMMARY OF THE INVENTION

In one aspect of the present invention, a level comprises: a level body comprising a substantially rectangular shape having a first side face, a second side face opposite the first side face defining a thickness therebetween, a base edge, a top edge opposite the base edge, opposed first and second ends, and a major length extending therebetween; a foam tape comprising an inner surface and an outer surface opposite the inner surface, wherein the inner surface is adhered to the base edge of the level body and the outer surface comprises a plurality of micro-suction cups; and at least one level detector coupled to the level body and operable to display a level reading of a surface when the base edge is adhered to the surface by the plurality of micro-suction cups.

In another aspect of the present invention, a level comprises: a level body comprising a substantially rectangular shape having a first side face, a second side face opposite the first side face defining a thickness therebetween, a base edge, a top edge opposite the base edge, opposed first and second ends, and a major length extending therebetween; a foam tape comprising an inner surface and an outer surface opposite the inner surface, wherein the inner surface is adhered to the base edge of the level body and the outer surface comprises a plurality of micro-suction cups; a level frame disposed through the thickness of the level body; and a level vial disposed across the level frame and visible from each of the first side face and the second side face, wherein the level vial comprises a pair of centered level markings, and a liquid is disposed within the level vial.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
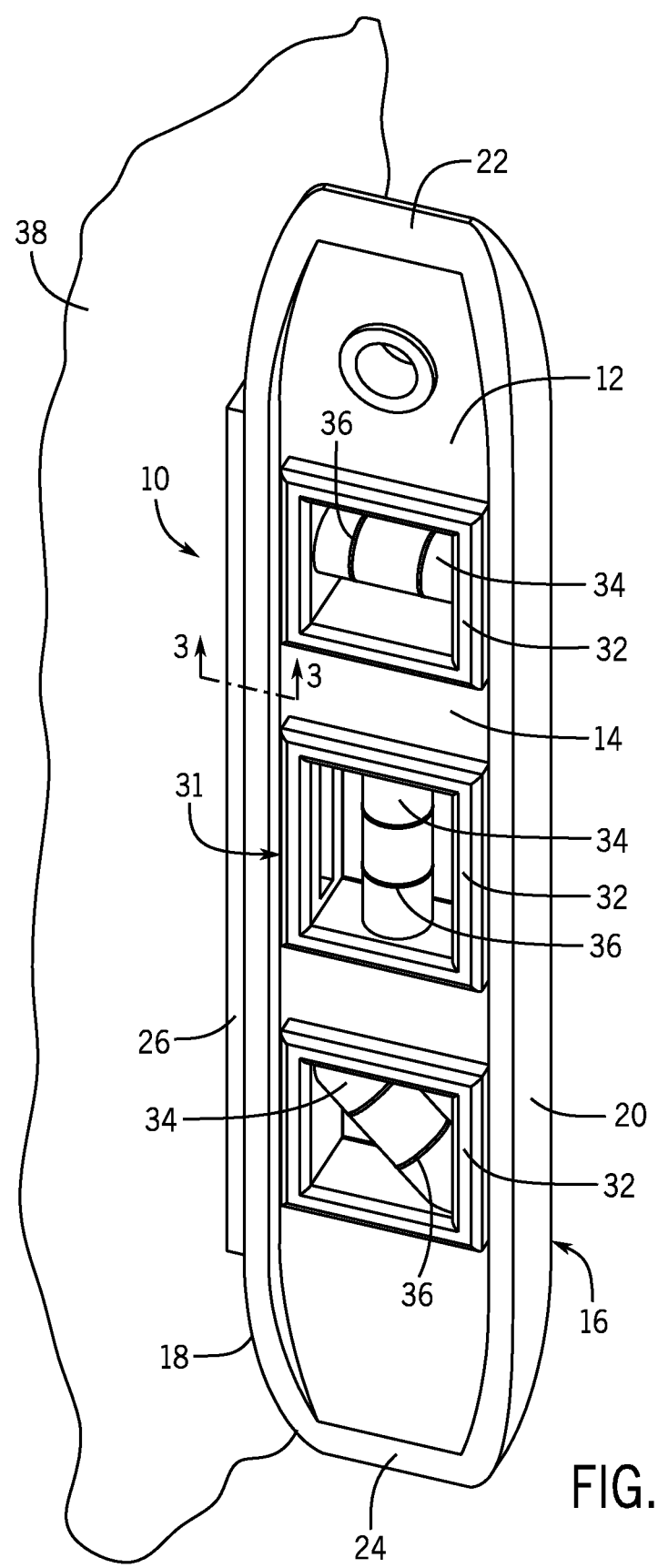
FIG. 1 is a perspective view of an embodiment of the present invention in use.
Figure 2:
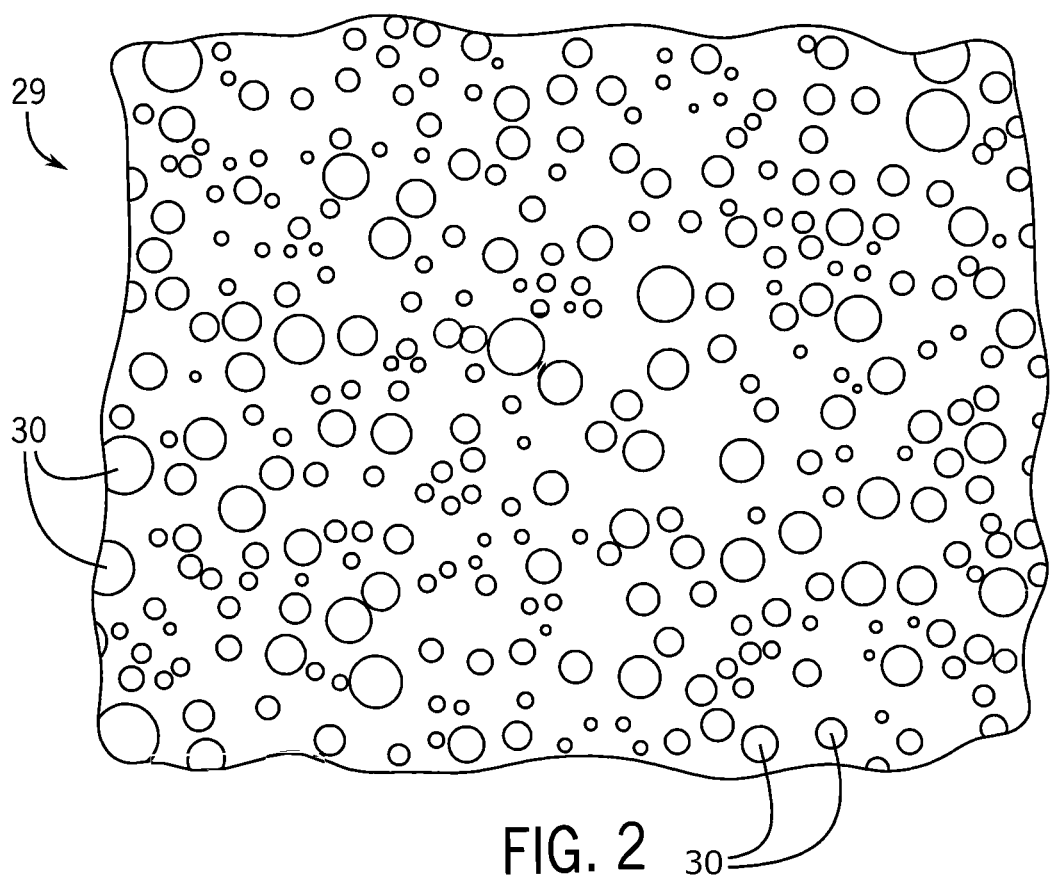
FIG. 2 is an enlarged plan view of a foam tape of the present invention illustrating a plurality of micro-suction cups.
Figure 3:
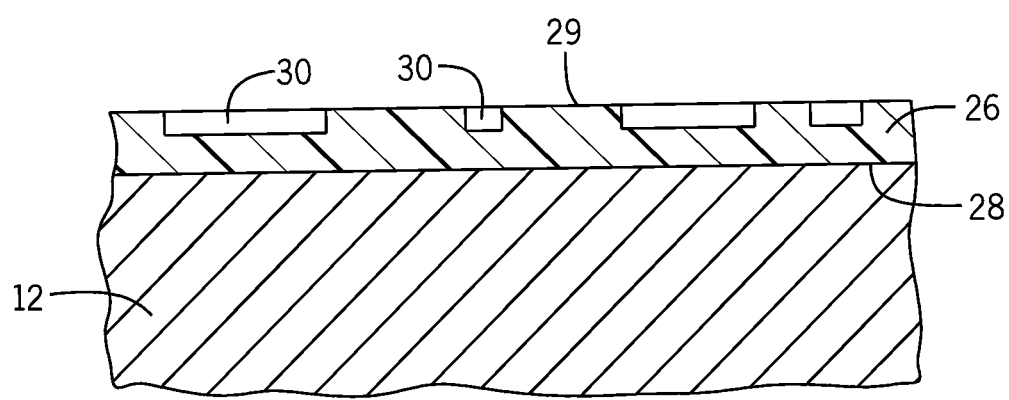
FIG. 3 is a cross-sectional view taken along line 3-3 in FIG. 1.

Referring to FIGS. 1 through 3, the present invention includes a level 10. The level 10 includes a level body 12. At least one level detector 31 is coupled to the level body 12. A foam tape 26 includes an inner surface 28 and an outer surface 29. The inner surface 28 is adhered to the level body 12. The outer surface 29 includes a plurality of micro suction cups 30. The level detector 31 is operable to display a level reading of a surface 38 when the level body 12 is adhered to the surface 38 by the plurality of micro suction cups 30.

The level body 12 is a substantially rectangular shape having a first side face 14, a second side face 16 opposite the first side face 14 defining a thickness therebetween, a base edge 18, a top edge 20 opposite the base edge 18, a first end 22, a second end 24 opposite the first end 22, and a major length extending therebetween. The foam tape 26 may be adhered to the base edge 18 along the major length of the level body 12.

In certain embodiments, the level detector 31 may be a spirit level. The spirit level includes a level frame 32 disposed through the thickness of the level body 12. A level vial 34 is disposed across the level frame 32 and may be visible from each of the first side face 14 and the second side face 16. A pair of centered level markings 36 are disposed on the level vial 34. A liquid, such as alcohol, is disposed within the level vial 34.

In certain embodiments, the level 10 may include a first level detector 31 having a vertical level vial 34, a second level detector 31 having a horizontal level vial 34, and a third level detector 31 having an angled level vial 34.

In certain embodiments, the level detector 31 may include a digital level. In such embodiments, the present invention may include a digital display on each of the first side face 14 and the second side face 16. The digital displays are connected to internal angular microelectromechanical systems (MEMS) technology.

As mentioned above, the foam tape 26 of the present invention includes a plurality of micro suction cups 30. The term "micro-suction cups" as used herein may refer to a configuration that allows the tape 26 to adhere to surfaces 38 via suction-like properties when the tape is applied to a suitable surface 38. Surfaces 38 are attached to the micro-suction cups by pressing the tape 26 against the surface 38. The foam tape 26 sticks to the surface 38 due to small bubbles (cavities) on the surface 38 of the tape 26. These contain air, which is squeezed out when the surface 38 of an object is pressed against the surface 38 of the foam tape 26. Due to sealing properties of the material, when the object is pulled off the surface 38, a vacuum is created in the cavities. Due to external air pressure, this creates a force that prevents the foam tape 26 from being removed from the surface 38, a mechanism similar to that of a suction cup.

In certain embodiments, the foam tape 26 is REGABOND-S™, which includes an acrylic foam material in which micro-suction cups are formed, a polyethylene terephthalate (PET) film supporting the acrylic foam, and an acrylic adhesive disposed on the other side of the PET film. The acrylic adhesive adheres to the base edge 18 of the level body 12.

It should be understood, of course, that the foregoing relates to exemplary embodiments of the invention and that modifications may be made without departing from the spirit and scope of the invention as set forth in the following claims.

What is claimed is:

1. A level comprising:
    a level body comprising a substantially rectangular shape having a first side face, a second side face opposite the first side face defining a thickness therebetween, a base edge, a top edge opposite the base edge, opposed first and second ends, and a major length extending therebetween;
    a foam tape comprising an inner surface and an outer surface opposite the inner surface, wherein the inner surface is adhered to the base edge of the level body and the outer surface comprises a plurality of micro-suction cups; and
    at least one level detector coupled to the level body and operable to display a level reading of a surface when the base edge is adhered to the surface by the plurality of micro-suction cups.

2. The level of claim 1, wherein the at least one level detector comprises:
    a level frame disposed through the thickness of the level body; and
    a level vial disposed across the level frame and visible from each of the first side face and the second side face, wherein
    the level vial comprises a pair of centered level markings, and a liquid is disposed within the level vial.

3. The level of claim 1, wherein the at least one level detector comprises a first level detector comprising a vertical level vial, a second level detector comprising a horizontal level vial, and a third level detector comprising an angled level vial.

4. A level comprising:
    a level body comprising a substantially rectangular shape having a first side face, a second side face opposite the first side face defining a thickness therebetween, a base edge, a top edge opposite the base edge, opposed first and second ends, and a major length extending therebetween;
    a foam tape comprising an inner surface and an outer surface opposite the inner surface, wherein the inner surface is adhered to the base edge of the level body and the outer surface comprises a plurality of micro-suction cups;
    a level frame disposed through the thickness of the level body; and
    a level vial disposed across the level frame and visible from each of the first side face and the second side face, wherein
    the level vial comprises a pair of centered level markings, and a liquid is disposed within the level vial.

* * * * *